UNITED STATES PATENT OFFICE.

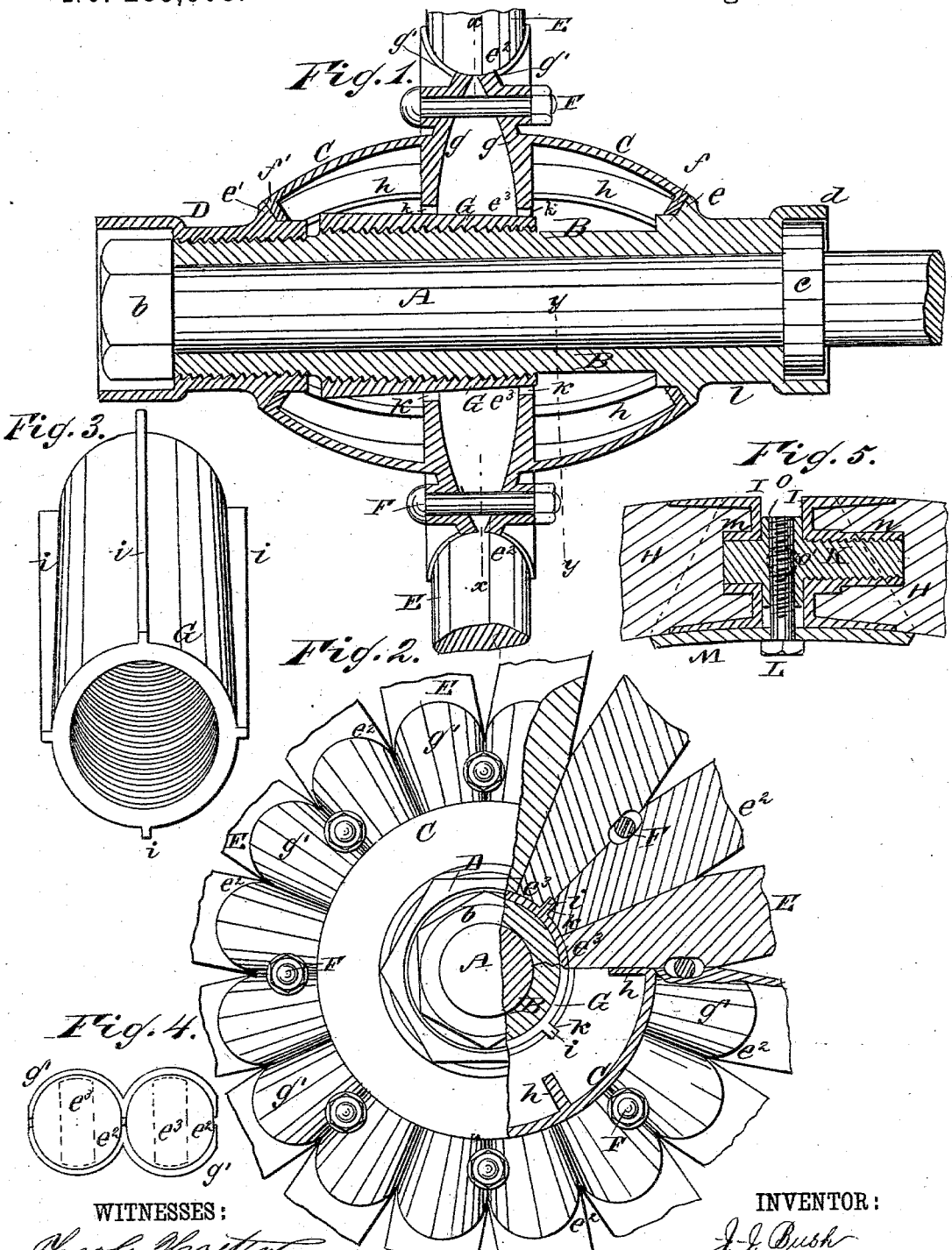

JAMES J. BUSH, OF TACOMA, WASHINGTON TERRITORY.

VEHICLE-WHEEL.

SPECIFICATION forming part of Letters Patent No. 283,563, dated August 21, 1883.

Application filed January 6, 1883. (No model.)

*To all whom it may concern:*

Be it known that I, JAMES J. BUSH, of Tacoma, in the county of Pierce and Territory of Washington, have invented certain new and useful Improvements in Wheels for Wagons and other Vehicles, of which the following is a full, clear, and exact description.

This invention consists in an expansion-wheel of novel construction for vehicles of different kinds, whereby increased facility is afforded for adjusting the wheel to its tire from time to time, as required, for putting on a tire, and for replacing spokes when necessary, also whereby many other advantages are obtained, substantially as hereinafter described.

Reference is to be had to the accompanying drawings, forming a part of this specification, in which similar letters of reference indicate corresponding parts in all the figures.

Figure 1 represents a longitudinal sectional view of the hub of a wheel as fitted on its axle with my improvements applied. Fig. 2 is a broken and partly-sectional face view of the central portion of the wheel, the section being taken irregularly, as indicated by the lines $x\,x$ and $y\,y$ in Fig. 1. Fig. 3 is a view in perspective of a cone which is used to provide for setting the spokes of the wheel in or out. Fig. 4 is an outside end view of two of the spoke-sockets in the hub with spokes therein; and Fig. 5 is a sectional view through two of the felly-sections, in part, with means for uniting them and for providing for their separation as required.

A in the drawings indicates the axle, having the usual nut, $b$, on the outer end of the box B, and inner collar, $c$, arranged within a surrounding hollow collar, $d$, of the box.

C C is the hub, which, as well as other parts or devices connected with it, may be made of malleable cast-iron. The box B, which goes through the hub, has an outwardly-diverging bevel-shoulder, $e$, which fits a corresponding shoulder or inwardly-turned flange, $f$, on the inner end of the hub. The outer or opposite end of the hub has a similar inwardly-turned flange, $f'$, which fits against an outwardly-diverging bevel-shoulder, $e'$, upon a screw collar or nut, D, that fits a screw-thread upon the box B, and is constructed at its outer end to receive the nut $b$ of the axle within it. The hub C C is divided transversely through its center, and by screwing up the nut D the two sections or halves C C of the hub bound by the collars $e\,e'$ are tightened on the spokes E E, said halves not meeting, to provide for such adjustment. Said parts have their screw-threads so regulated that they will turn on when the wheel is going ahead. The beveling construction of the shoulders $e\,e'$ and of the inward collars or flanges $f\,f'$ on the outer ends of the half-hubs more effectually restrains said half-hubs from wearing loose than if they fitted against square faces. Each half-hub is formed, in part, of an outer shell, with flanges $g\,g'$, arranged to extend inward and outward from the hub, and shaped internally to correspond with the shape of the spokes, that may either be round or oval in their transverse section, according to the number or size of them in the wheel, said inward and outward flanges hugging the spokes when the hub is tightened up. The outside flanges, $g'$, may be made to conform externally as well as internally to the shape of the spokes, to insure lightness and neatness, and there is practically wide latitude as to the width of them. While the spokes are of a rounded or oval shape where they fit into the outside flanges, $g'$, they are of a flat construction, and taper on their sides toward the center of the wheel where they fit within the inside flanges, $g$. Bolts F are passed between every other spoke, and by means of these bolts and the nut D on the end of the box an effective tightening action is secured. Where the bolts F pass through the outside flanges, $g'$, straight faces are formed on said flanges for the nuts and heads of the bolts, as shown in Fig. 1. The necks of said bolts should be made slightly oval, to keep them from turning, the holes in the outside flanges through which they pass being made to correspond. Upon the inside of the shells of the half-hubs C C are six (more or less) ribs or braces, $h$, extending from the shoulders or inwardly-bent outer end flanges, $f\,f'$, to the flanges $g$. These give great strength with little metal to the sectionally-constructed hub.

G is a hollow cone or circular wedge, fitted to screw onto the central portion of the box B, and is moved longitudinally by turning the box. Said cone passes through the inside flanges, $g\,g$, and has four (more or less) longitudinal ribs, $i$, on its exterior, which ribs fit corresponding grooves, $k$, in the flanges $g\,g$, to keep the cone from turning when rotating the box to work the cone in or out longitudinally. The inner ends of the spokes E E rest upon this cone, which serves to give the wheel its expansion character, the cone, as it is screwed inward, forcing the spokes out. The box B is externally of a six-sided or other angular configuration beyond its shoulder $e$, as at $l$, to provide for the turning of it by a wrench, and should be of the same size as the nut D, so that the same wrench will fit both.

To expand the wheel, all that is necessary is to slacken the nut D on the box and the nuts on the bolts F, and then to apply the wrench to the part $l$ of the box, hold onto the wheel, and turn the box so that it will operate the cone G in longitudinally as required. It is preferred to provide each wheel with two cones of different sizes or tapers, so that if the one or smaller cone is insufficient to give the necessary expansion or contraction it may be removed and the other or larger cone be inserted in its place. By this provision the cones may be made of diminished taper and will work better.

By making the spokes E of oval or round form they are prevented from getting loose when forced outward, as they would be apt to do if made flat with square corners by being pushed out of their sockets and getting loose sidewise; whereas, being of round or oval shape, they cannot leave their sockets or get loose when being tightened up. To insert one or more spokes in the wheel, the nuts D and bolts F are slackened off a little and the cone G backed out as far as possible by turning the box B. Then the nut $b$ is taken off, the wheel removed from the axle and the box B, and taken out, after unscrewing it from the cone, the nut D being first removed, after which the bolts F are removed and the hub taken off and the cone G pulled out, when the spokes to be replaced by others may be pulled out of the felly or rim and new ones put in their places, and the hub be put together again and secured as before. All this may readily be done by any one of ordinary ability, and does not require skilled labor.

As in expanding a wheel the joints of the felly H (see Fig. 5) are spread open, I fit the adjacent ends of the felly-sections within metallic sockets I I, which keep the ends of the wooden felly-sections from splitting. Said sockets have hollow hubs $m\,n$, that are let into the felly-sections, and serve to receive within them a collar-bolt, K, the collar of the bolt being between said sections and having two holes, $o\,o'$, through it at right angles with each other. The one of these holes, $o'$, is smooth and the other, $o$, has a thread to receive a screw-bolt, L. Furthermore, one end of the collar-bolt, which fits within one of the sockets, is smooth and the other end thereof is fitted to screw into the other socket, and the two socketed felly-sections are forced apart or drawn together by means of a lever inserted in the smooth hole $o'$.

M is a metal cap, constructed to receive within it the ends of the felly-sections and their sockets, and to conceal said parts and exclude dirt therefrom. Said cap has a hole to receive through it the bolt L, which screws into the hole $o$ of the collar-bolt K and keeps it in place; also, holds the cap M to its place. This construction provides for spreading apart the felly-sections when expanding the wheel.

Fig. 4 shows more clearly the construction of the hub for reception of the spokes, $g'$ being the outside flanges, which receive within them the circular or oval portions $e^2$ of the spokes, and $e^3$ the tapering flattened inner portions of the spokes that are received between the inside flanges $g$.

In a wheel constructed as described the tire can always be kept tight, and if it should get off can readily be put on by any person unskilled to such work. It will be found of special advantage in light wheels, as such require to be kept in good order. There will be no danger of dishing the wheel, as when in tightening up the tire as it gets loose in dry weather, as often is the case, by reason of the blacksmith employed for the purpose putting the tire on a little too tight, and in wet weather the effect is ordinarily even worse. My invention provides for either expanding or contracting the wheel to its tire, on the road or anywhere, by any one with ordinary ability, and in a few minutes of time only; also, in case of a broken spoke a new one may be inserted with equal facility.

It is designed to have all the spokes turned to a gage, and marked with a number corresponding to the size of the wheel they are designed for, and to similarly mark the hub, and so with the other parts that may require to be duplicated, whereby, whenever such parts require to be replaced, this may always be done from an extra supply on hand, or duplicates of such parts may be ordered, and be sure to fit. By thus making the wheels with their parts in duplicate the same may be very cheaply manufactured, and both space and freight will be economized in the shipment of said wheels in separate pieces, ready to be put together as required.

Having thus fully described my invention, I claim as new and desire to secure by Letters Patent—

1. The half-hubs C C, having shell-like bodies, and provided with the inwardly-bent flanges $f\,f'$, in combination with the box B, having the beveled shoulders $e$, and the nut D, having the beveled shoulder $e'$, substantially as herein shown and described, whereby the half-hubs are prevented from wearing loose, as set forth.

2. The combination, with the box B and the nut D, having beveled shoulders $e\,e'$, of the half-hubs C C, provided with the inwardly-bent flanges $ff'$, and the flanges $gg'$, constructed as herein shown and described, and the bolts F, substantially as and for the purpose set forth.

3. The combination, with the externally-screw-threaded box B and the half-hubs C C, provided with the flanges $g$, having notches $k$, of the internally-screw-threaded cone provided with the longitudinal ribs $i$, substantially as herein shown and described.

4. The metallic half-hubs C C, having bodies of shell-like construction stiffened internally by ribs $h\ h$, and constructed with inwardly-bent outer end flanges, $ff'$, essentially as described.

5. The metallic end sockets, I, provided with the plain hub $m$ and the internally-screw-threaded hub $n$, in combination with the collar-bolt $k$, provided with the holes $o\ o'$, the hole $o$ being screw-threaded, the screw L, and the cap-plate M, substantially as herein shown and described.

6. The combination, with the felly-sections, of the metallic end sockets, I I, constructed with hubs $m\ n$, the collar-bolt K, fitted within said hubs, as described, and provided with a lateral aperture, $o'$, the screw-bolt L, and the cap M, substantially as and for the purposes herein set forth.

JAMES J. BUSH.

Witnesses:
  E. H. McARTHUR,
  A. WALTERS.